US012651984B2

(12) United States Patent
Wilson-Jones et al.

(10) Patent No.: US 12,651,984 B2
(45) **Date of Patent: *Jun. 9, 2026**

(54) DUAL MOTOR DRIVE ASSEMBLY

(71) Applicant: ZF Automotive UK Limited, Solihull (GB)

(72) Inventors: Russell Wilson-Jones, Stratford upon Avon (GB); Mark Anthony Wilkes, Kings Norton (GB); Aleksejs Semjonovs, Snohomish (LV)

(73) Assignee: ZF Automotive UK Limited, Solihull (GB)

( * ) Notice: Subject to any disclaimer, the term of this patent is extended or adjusted under 35 U.S.C. 154(b) by 192 days.

This patent is subject to a terminal disclaimer.

(21) Appl. No.: 18/463,546

(22) Filed: Sep. 8, 2023

(65) Prior Publication Data

US 2024/0097585 A1 Mar. 21, 2024

(30) Foreign Application Priority Data

Sep. 13, 2022 (GB) ..................................... 2213363

(51) Int. Cl.
| | |
|---|---|
| *H02P 5/753* | (2006.01) |
| *B62D 5/00* | (2006.01) |
| *B62D 5/04* | (2006.01) |
| *H02K 7/116* | (2006.01) |

(52) U.S. Cl.
CPC .............. *H02P 5/753* (2013.01); *B62D 5/006* (2013.01); *B62D 5/0409* (2013.01); *H02K 7/1166* (2013.01)

(58) Field of Classification Search
CPC .... H02K 5/1735; H02K 7/1166; H02K 11/38; H02K 26/00; B62D 5/0409; B62D 5/0463; H02P 8/40; H02P 5/00; H02P 6/04
See application file for complete search history.

(56) References Cited

U.S. PATENT DOCUMENTS

| | | | |
|---|---|---|---|
| 2016/0090119 A1 | 3/2016 | Tomizawa et al. | |
| 2019/0320874 A1 | 10/2019 | Yu et al. | |
| 2019/0367076 A1* | 12/2019 | Kim ..................... | B62D 5/0409 |
| 2020/0070879 A1 | 3/2020 | Kim | |
| 2021/0269087 A1 | 9/2021 | Zhao et al. | |

* cited by examiner

*Primary Examiner* — Said Bouziane
(74) *Attorney, Agent, or Firm* — Kristin L. Murphy

(57) ABSTRACT

A dual motor drive assembly comprising a housing, a shaft rotatably mounted with respect to the housing, a first gear connected to and configured to rotate with the shaft, first and second motor circuits, each motor circuit including a motor having an output driving a respective output gear, the output gears being engaged with the first gear, a control circuit adapted to allocate independent torque demands to each of the first and second motors to cause a net torque to be applied to the shaft comprising the sum of the torques applied by the two motors, and a processing circuit adapted to estimate the level of load independent mechanical friction of the system by applying torque demands to the two motors.

12 Claims, 11 Drawing Sheets

DUAL MOTOR DRIVE ASSEMBLY

CROSS-REFERENCE TO RELATED APPLICATION

This application claims priority to GB Priority Application No. 2213363.1, filed Sep. 13, 2022, the disclosure of which is incorporated herein by reference in its entirety.

TECHNICAL FIELD

This disclosure relates to a dual motor drive assembly, in particular but not exclusively suitable for use in a handwheel actuator (HWA) assembly of a vehicle.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver moves and the steered wheels with movement of the hand wheel by the driver being detected by a sensor and the motor being driven in response to the output of the sensor to generate a force that steers the road wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor at coupled to the steering wheel. The secondary motor provides the driver with the appropriate resistance and feedback in response to specific user inputs at the steering wheel to mimic the feel of a conventional steering system.

SUMMARY

The HWA imposes a friction on the steering wheel shaft. This friction is mostly comprised of a load-dependent component that increases as the torque transmitted by the gearbox increases. There is also an approximately constant component that is not load-dependent. The total HWA friction is the sum of these two components.

Imbalance between the two motor outputs can occur temporarily due to imbalanced operating temperatures, or more permanently due to degradation in motor components or the controlling electronic components. Where there is an imbalance in a motor circuit, by which we mean all the components from the input of the torque demand through to the output from the motor rotor, a demand for a given level of torque from each of the motors will result in the actual torque being output from the two motors being different.

The friction can vary according to the operating temperature of the gearset, wear in the gearset and other factors.

It is desirable to measure the amount of motor-to-motor imbalance and also the friction in the gearbox to allow the general condition of the HWA over life to be checked.

In accordance with an exemplary arrangement of the disclosure, there is provided a dual motor drive assembly comprising:

a housing;

a shaft rotatably mounted with respect to the housing;

a first gear connected to and configured to rotate with the shaft;

first and second motor circuits, each motor circuit including a motor having an output driving a respective output gear, the output gears being engaged with the first gear, a control circuit adapted to allocate independent torque demands to each of the first and second motors to cause a net torque to be applied to the shaft comprising the sum of the torques applied by the two motors, and a processing circuit adapted to estimate the level of load independent mechanical friction of the system by applying torque demands to the two motors that include equal and opposite offset components which provide a net zero torque plus an additional torque component that is applied to the motors to provide an overall non-zero torque to the first gear, in which the processing circuit varies the difference between the motor torques demanded from each motor over a range of values at a time when there are no external inputs to the system and observes the lowest value of the net torque within that range that overcomes the mechanical friction to cause the shaft to rotate at a constant velocity and in which the processing circuit is further arranged to estimate any imbalance between the two motor circuits by observing the difference in the values of the net torque demands required to cause the shaft to rotate at the constant speed in a first direction and the values of the net torque demands required to cause the shaft to rotate at a constant speed in the opposite direction.

The applicant has appreciated that a perfectly balanced system where both motors output the same torque to the first gear for identical torque demands will yield the same magnitude for the net torque required to make the shaft spin in one direction at a constant speed and to spin in the other direction at the same constant speed. Where an imbalance exists between the motors the two measured net torques will differ and this is used to determine the amount of imbalance. This is because the motors will output different actual torques for a given torque demand where there is imbalance and so each motor behaves differently to the other.

This disclosure provides a process to measure the friction and the motor imbalance at a time when there are no external inputs on the system and as such it is most likely to be used as part of a power-up or power-down test sequence, but may also be implemented during normal operation (e.g. when the vehicle is in some autonomous mode and the driver is not applying any external torque to the system through a handwheel).

A net torque may be defined as an instantaneous sum of the two motor torque demands.

The processing circuit may identify the net torque that overcomes the friction as the value which causes the shaft to rotate at a constant angular speed whilst keeping the offset torque values at a constant level. One method to measure this torque is to use a closed-loop controller to adjust the net torque. The closed-loop controller will regulate the angular speed and observe the net torque demand from the controller in a quasi-steady-state condition.

The processing circuit may vary the magnitude of the offset components to vary the load dependent friction in the system and to estimate the mechanical friction coefficient of the system as a function of the load applied to the gearbox by the offset components. In these test conditions, the load is predominantly the difference between the torque applied by the first motor and the torque applied by the second motor. Therefore the friction coefficient and constant friction component may be estimated by varying the difference between the first and second motor torque whilst adjusting the average applied torque to maintain the quasi-static condition. The estimate may be stored in in the processing circuit for future reference.

In a modification, the processing circuit may estimate the mechanical friction as a function of the applied load by identifying the net torque that is required to overcome the friction whilst the difference in torque applied by the first and second motors is changed whilst adjusting the net applied torque to keep the shaft rotating at a constant angular speed in both a first direction of movement, and a second direction.

The applicant has appreciated that the torque applied by the first motor and the torque applied by the second motor may be different depending on the direction of rotation of the shaft, so identifying this in both directions allows an estimate of the imbalance to be made.

In a further arrangement, estimating the friction and imbalance may cause the shaft to rotate at two or more different speeds and to identify the net torque required to just overcome the friction for each speed as the value which maintains those different speeds.

This allows an estimate of viscous friction to be determined which varies as a function of shaft rotational speed.

This additional estimation of viscous friction may also be performed for rotations of the shaft in the two opposing directions.

The control circuit may generate independent control signals for each motor and a drive circuit for each motor that causes a motor torque to be generated in response to the control signals.

The motor controller may be configured as a velocity demand based control system in which the torque demands applied to each motor are set based by feeding back to the controller measurements of the shaft velocity. The net torque may be adjusted according to the error between the target shaft velocity and the measured shaft velocity.

The motor controller can also be configured as an angle control system in which the angle demand is set as a ramp to provide a period of constant velocity operation. In this case, the net torque is adjusted according to the error between a measured angle and the angle demand.

The first gear may comprise a wormwheel, and each motor may be connected to the wormwheel through a respective output gear comprising a worm gear.

The dual motor drive assembly may comprise a part of a Steer-by-Wire Handwheel actuator assembly for a vehicle.

The motors may be provided with individual control of each motor with an ability to set the target torque for each motor.

In accordance with another exemplary arrangement, there is provided a method of determining the imbalance between two motors in a dual motor drive assembly of the kind comprising:

a housing;

a shaft rotatably mounted with respect to the housing;

a first gear connected to and configured to rotate with the shaft;

first and second motors, each having an output driving a respective output gear, the output gears being engaged with the first gear and a control circuit for allocating independent torque demands to each of the first and second motors to cause a net torque to be applied to the shaft, the method comprising:

applying drive signals to the two motors to cause them to apply torques to the shaft that add up to the total demand torque with a varying difference between the two motor torque levels over a range of values at a time when there are no external inputs to the system; and observing the net torque that overcomes the mechanical friction to cause the shaft to turn at a constant velocity with a particular difference between the first and second motor torque, and further comprising estimating the imbalance between the two motors by measuring the demanded net torque required to maintain a constant speed in two directions of movement.

BRIEF DESCRIPTION OF DRAWINGS

There will now be described by way of an example of the present disclosure with reference to and as illustrated in the accompanying drawings of which.

DETAILED DESCRIPTION

Figure 1:
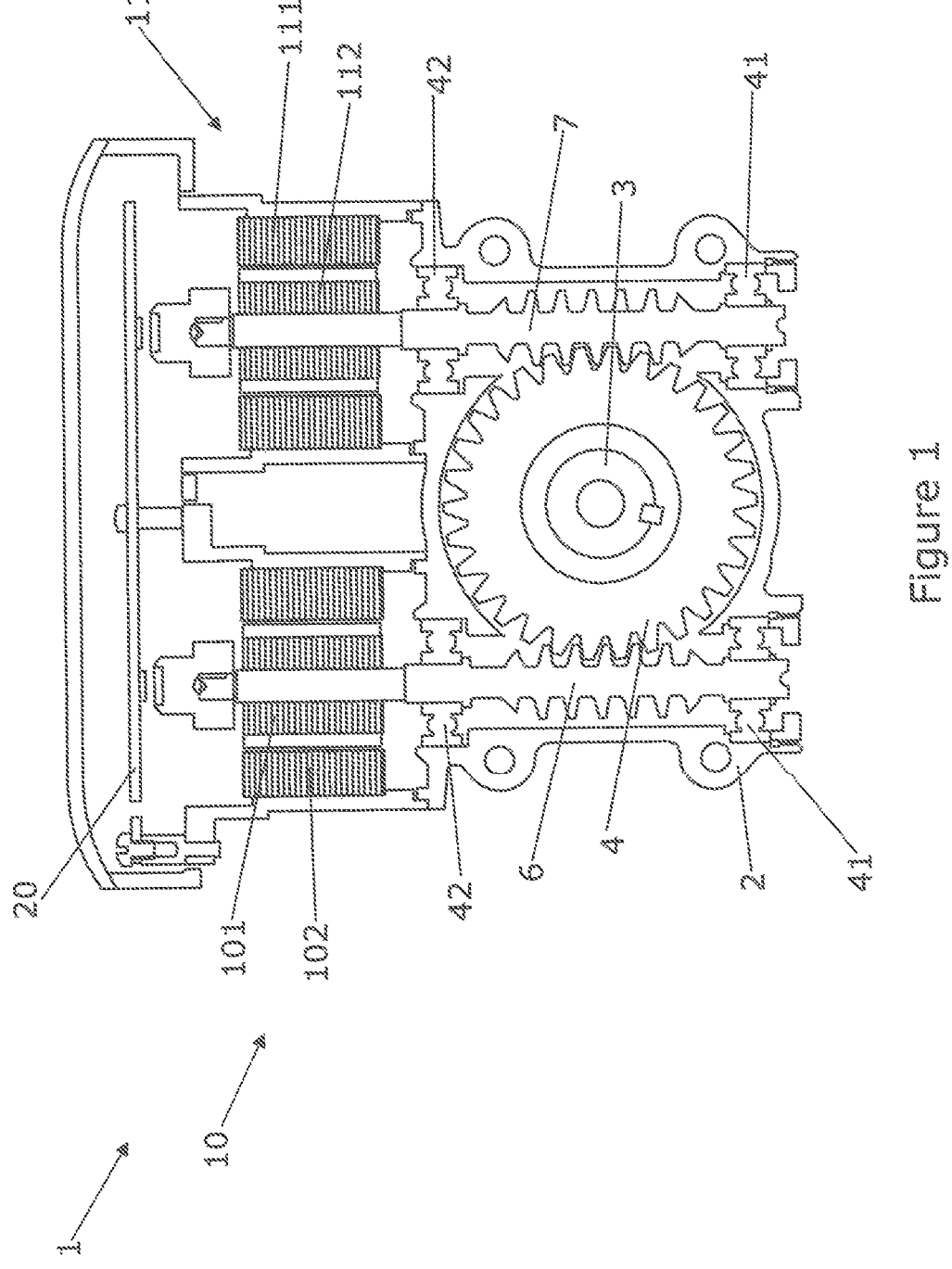
FIG. 1 shows an exemplary arrangement of a dual motor drive assembly.

FIG. 1 shows a dual motor drive assembly, suitable for use in a handwheel actuator (HWA) assembly of a vehicle, according an exemplary arrangement of the disclosure. The drive assembly 1 includes a first motor 10 with rotor 101 and stator 102 and a second motor 11 with rotor 111 and stator 112, the first motor 10 being connected to a first worm gear 6 and the second motor 11 being connected to a second worm gear 7. Each worm gear 6, 7 comprises a threaded shaft arranged to engage with a gear wheel 4 connected to a steering column shaft 3 such that torque may be transferred from the worm gears 6, 7 to the gear wheel 4 connected to the steering column shaft 3. The gear wheel 4 is operatively connected to a driver's handwheel (not shown) via the steering column shaft 3. In this example, each of the two motors 10, 11 are brushless permanent magnet type motors and each comprise a rotor 101, 111 and a stator 102, 112 having many windings surrounding regularly circumferentially spaced teeth. The arrangement of the two motors 10, 11, the shaft 3, the worm gears 6, 7 and the wheel gear 4 together form a dual motor electrical assembly.

Each of the two motors 10, 11 are controlled by an electronic control unit (ECU) 20. The ECU 20 controls the level of current applied to the windings and hence the level of torque that is produced by each motor 10, 11.

In this example, the two motors 10, 11 are of a similar design and produce a similar level of maximum torque. However, it is within the scope of this disclosure to have an asymmetric design in which one motor 10, 11 produces a higher level of torque than the other 10, 11.

One of the functions of a handwheel actuator (HWA) assembly is to provide a feedback force to the driver to give an appropriate steering feel. This may be achieved by controlling the torque of the motors 10, 11 in accordance with signals from the handwheel actuator (such as column angle) and from other systems in the vehicle (such as vehicle speed, rack angle, lateral acceleration and yaw rate).

The use of two motors 10, 11 is beneficial in eliminating rattle. If a single electric motor were instead used in a torque feedback unit, the motor may be held in locked contact with the gearing by a spring. However, in certain driving conditions the action of a spring is not sufficiently firm, which allows the gears to "rattle" during sinusoidal motions or sharp position changes of the steering column.

Use of two motors 10, 11 which can be actively controlled (as in the present disclosure) ameliorates the problems associated with use of a single motor. In this arrangement, both motors 10, 11 are controlled by the ECU 20 to provide torque feedback to the steering column and to ensure that the worm shafts 6, 7 of both motors 10, 11 are continuously in contact with the gear wheel 4, in order to minimise rattle. The use of two motors 10, 11 in this way also allows active management of the friction and thereby the feedback force to the driver.

As shown in FIG. 1, the motors 10, 11 are received in and secured to a transversely extending two-part extension of a housing 2. The worm shaft 6, 7 of each motor is supported relative to the housing by two sets of bearings. A first set of bearings 41 supports an first end of each worm shaft 6, 7 distal their respective motor 10, 11 while a second set of bearings 42 supports a second end of each worm shaft 6, 7 proximal their respective motor 10, 11.

Figure 2:
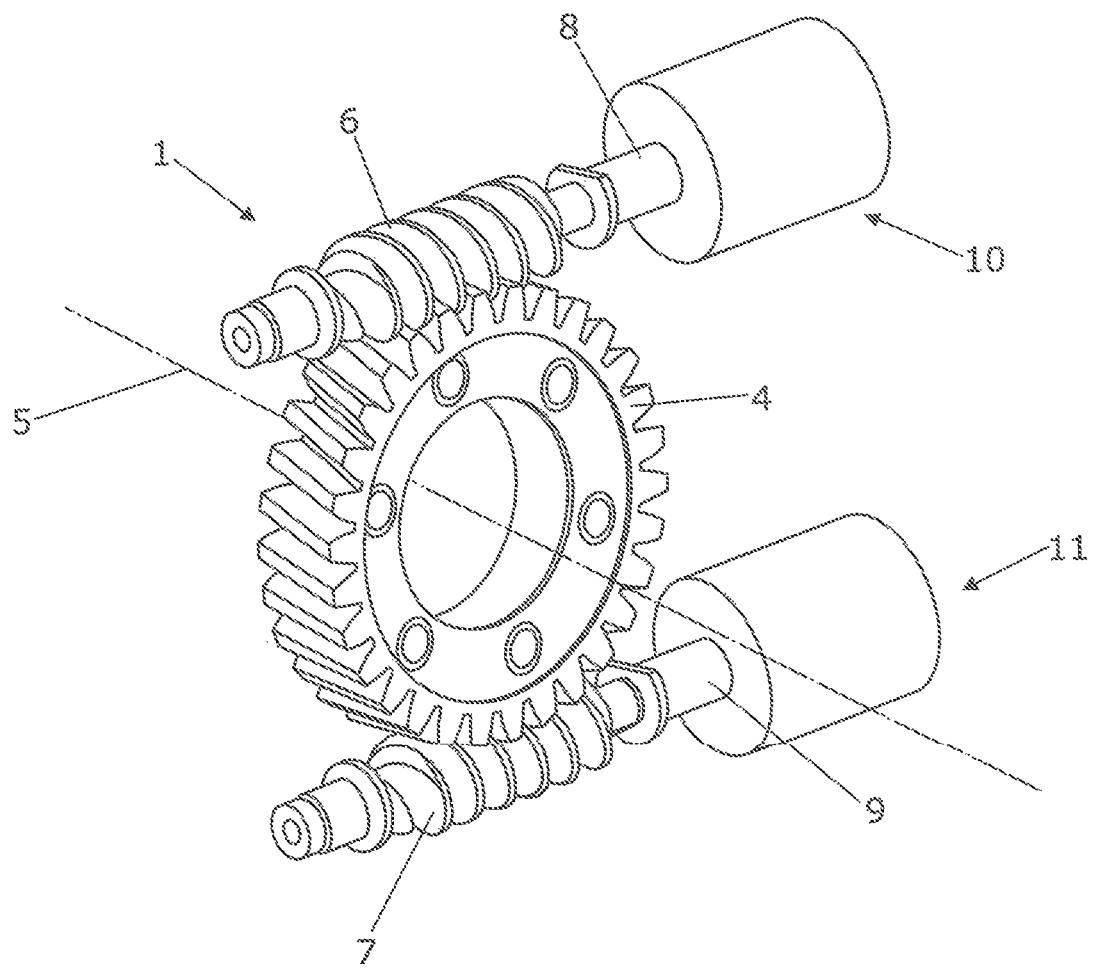
FIG. 2 shows a part of the dual motor drive apparatus of FIG. 1 with the gearbox housing removed to better show the gears and the motor connection to the gears.

FIG. 2 shows an axis of rotation of the shaft 3 marked using a dashed line 5, extending perpendicularly through the gearwheel 4. The periphery of the gear wheel 4 is formed as a worm gear which meshes with each of two identical worm screws 6, 7 located on opposite sides of the longitudinal axis 5 of the shaft 3. Each worm screw 6, 7 is connected to the output shaft 8, 9 of a respective electric motor 10, 11.

The axes of the output shafts 8, 9 of the two motors 10, 11 are arranged perpendicularly to the rotational axis of the shaft 3 and the axes of the two motors may also be inclined with respect to each other, to reduce the overall size of the assembly.

The motors 10, 11 are controlled by the electronic control unit (ECU) 20 such that at low levels of input torque applied to the shaft 3 by the handwheel, the motors 10, 11 act in opposite directions on the gear wheel 4 to eliminate backlash. At higher levels of input torque applied to the shaft 3 by the handwheel, the motors 10, 11 act in the same direction on the gear wheel 4 to assist in rotation of the shaft 3. Here, a motor 10, 11 acting in 'a direction' is used indicate the direction of torque applied by a motor 10, 11 to the gear wheel 4.

The use of two separate motors 10, 11 which can be controlled in a first operational mode to apply torque in opposite directions to the gearwheel 4 eliminates the need to control backlash with precision components. In addition, the use of two separate motors 10, 11 which can be controlled in a second operational mode to apply torque in the same direction to the gear wheel 4 allows the motors 10, 11 and gear components 4, 6, 7 to be specified at half the rating of the required total system torque, thereby reducing the size and cost of the drive assembly 1.

In the exemplary arrangement shown in FIGS. 1 and 2, the worm shafts 6, 7 engage diametrically opposed portions of a gear wheel 4. The threads of the worm shafts 6, 7 each have the same sense, i.e., they are both left-handed screw threads. The motors 10, 11 are configured such that they lie on the same side of the gear wheel 4 (both motors 10, 11 lie on one side of a virtual plane perpendicular to axes of the worm shafts 6, 7 and passing through the centre point of the gear wheel 4). Considering as an example the perspective shown in FIG. 2, driving both motors 10, 11 clockwise would apply torque in opposite directions to the gear wheel 4, with motor 10 applying a clockwise torque to gear wheel 4 and motor 11 applying an opposing anti-clockwise torque to gear wheel 4.

Figure 3:
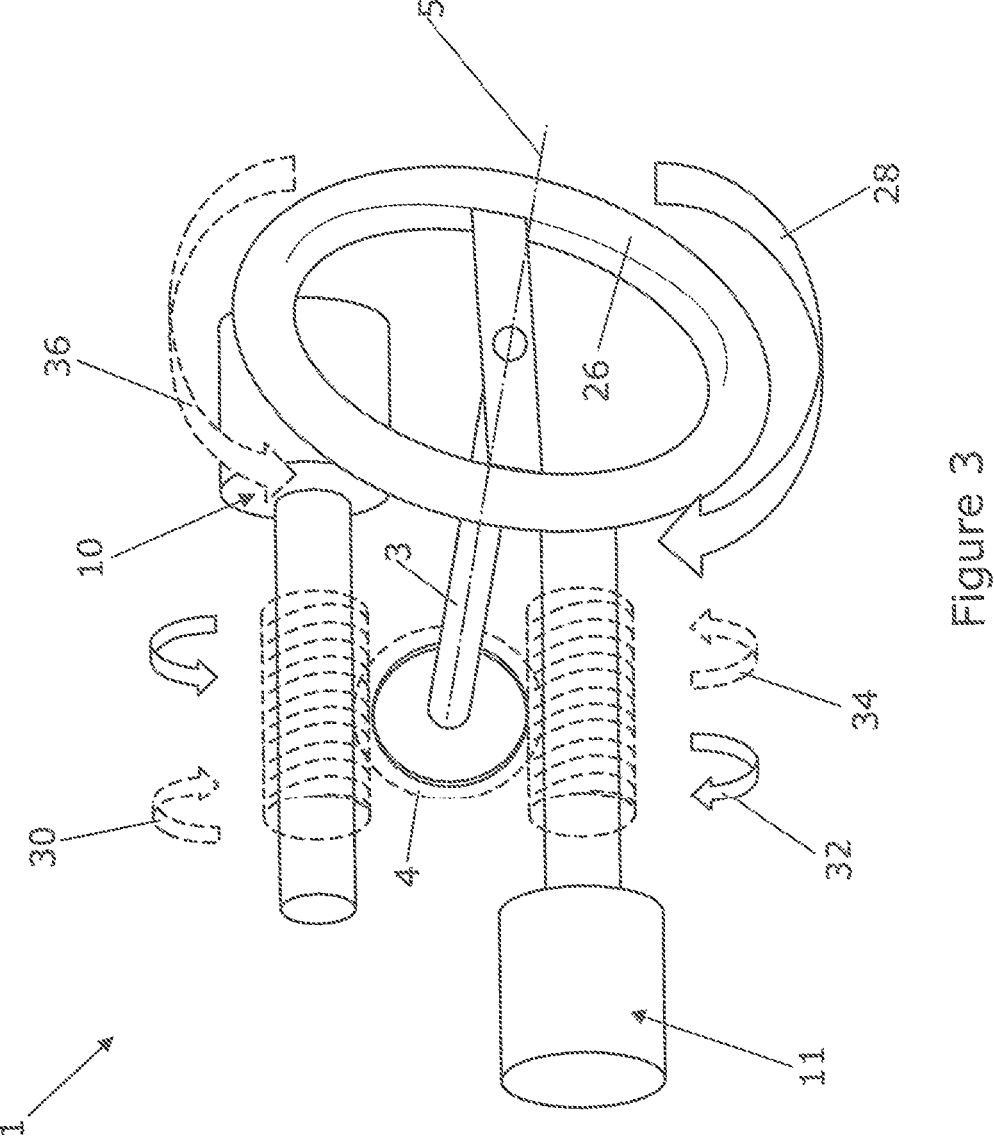
FIG. 3 shows another exemplary arrangement of a dual motor drive assembly.

FIG. 3 shows another exemplary arrangement of a dual motor drive assembly, substantially similar to the exemplary arrangement shown in FIGS. 1 and 2 but with different motor positioning.

FIG. 3 shows another exemplary arrangement of a dual motor drive assembly 1 according to the exemplary arrangement. This exemplary arrangement is substantially similar to the exemplary arrangement shown in FIGS. 1 and 2 with the only difference being the positioning of the motors 10, 11. Components and functional units which in terms of function and/or construction are equivalent or identical to those of the preceding exemplary arrangement are provided with the same reference signs and are not separately described. The explanations pertaining to FIG. 1 and FIG. 2 therefore apply in analogous manner to FIG. 3 with the exception of the positioning of the two motors 10, 11.

In FIG. 3 the worm shafts 6, 7 engage diametrically opposed portions of a gearwheel 4 and threads of the worm shafts 6, 7 each have the same sense, i.e., in this example, they are both right-handed screw threads. The motors 10, 11 are configured such that they lie on opposing sides of the gear wheel 4 (motor 10 lies on one side of a virtual plane perpendicular to axes of the worm shafts 6, 7 and passing through the centre point of the gear wheel 4 while motor 11 lies on the other side of this virtual plane).

Application of torque by a driver in a clockwise direction indicated by solid arrow 28 results in rotation of the handwheel 26 and the steering column shaft 3 about the dashed line 5. This rotation is detected by a rotation sensor (not shown). The first motor 10 is then controlled by the ECU 20 to apply torque in the opposite direction as indicated by dashed arrow 30. In a first operational mode, the second motor 11 is actuated by the ECU 20 to apply an offset torque 32 in the opposite direction to the torque 30 of the first motor 10 to reduce gear rattling. In another exemplary arrangement, in a second operational mode, the second motor 11 is actuated by the ECU 20 to apply a torque 34 in the same direction to the torque 30 of the first motor 10 to increase the feedback torque to the steering column shaft 3. Whether the drive assembly 1 is operated in the first operational mode or in the second operational mode depends on the circumstances, as will be explained below.

The net result of the torques 30, 32, 34 applied by the first and second motors 10, 11 results in an application of a feedback torque to the steering column shaft 3 and handwheel 26, as indicated by a dashed arrow 36, to provide a sensation of road feel to the driver. In this example, the application of a feedback torque is in the opposite direction to that applied to the handwheel 26 by the driver. In this way, the "rattle" produced between the worm shafts 6, 7 and the gear wheel 4 can be eliminated or significantly reduced.

Figure 4:
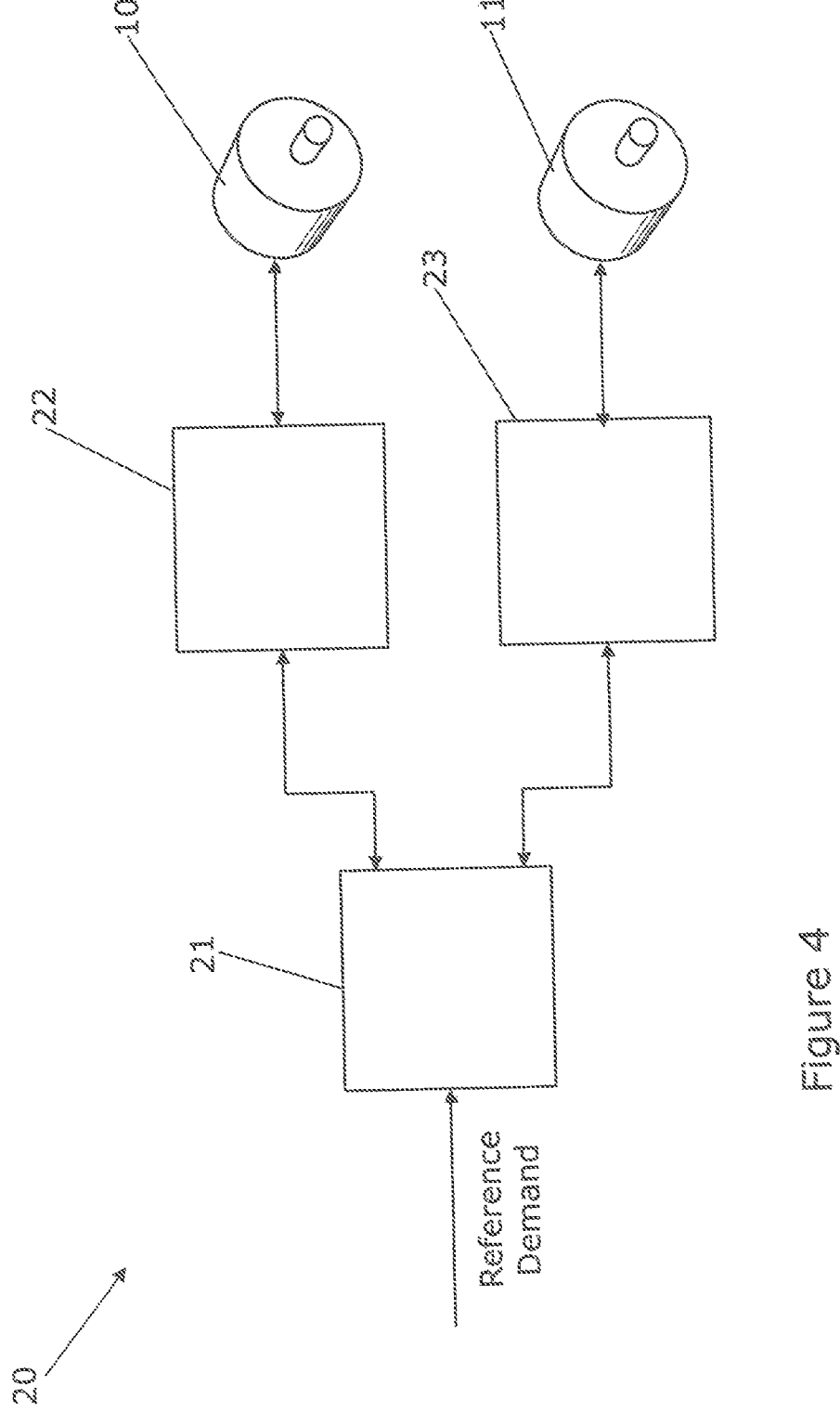
FIG. 4 shows a general arrangement of an electronic control unit which controls the two motors of a dual motor drive assembly.

FIG. 4 reveals part of an HWA assembly (80) showing a general arrangement of an electronic control unit (ECU) 20 which controls each of the two motors 10, 11. The ECU 20 may include a hand wheel actuator (HWA) control system 21 as well as a first and second motor controller 22, 23 which control the first and second motors 10, 11 respectively. A reference demand signal is input to the HWA control system 21 which allocates torque demands to each of the first and second motors 10, 11. These motor torque demands are converted to motor current demands and transmitted to the first and second motor controllers 22, 23. Each motor 10, 11 provides operating feedback to their respective motor controller 22, 23. The HWA control system 21 is configured to calculate the magnitude of mechanical friction using the motor torque demands. In another exemplary arrangement, the HWA control system 21 may be implemented by a separate ECU to the first and second motor controller 22, 23.

Figure 5:
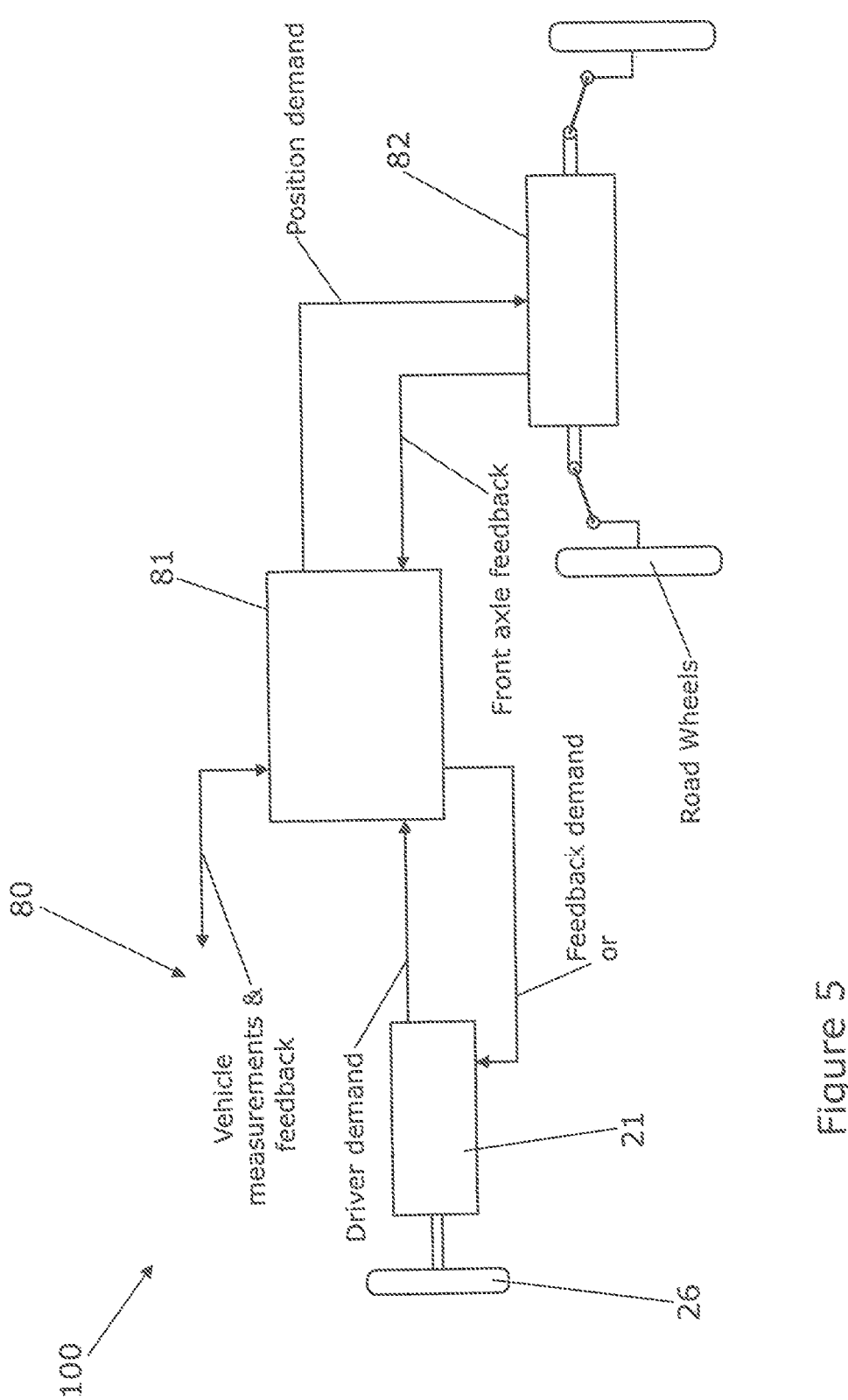
FIG. 5 shows a layout of a Steer-by-Wire system including a dual motor drive assembly.
Figure 6:
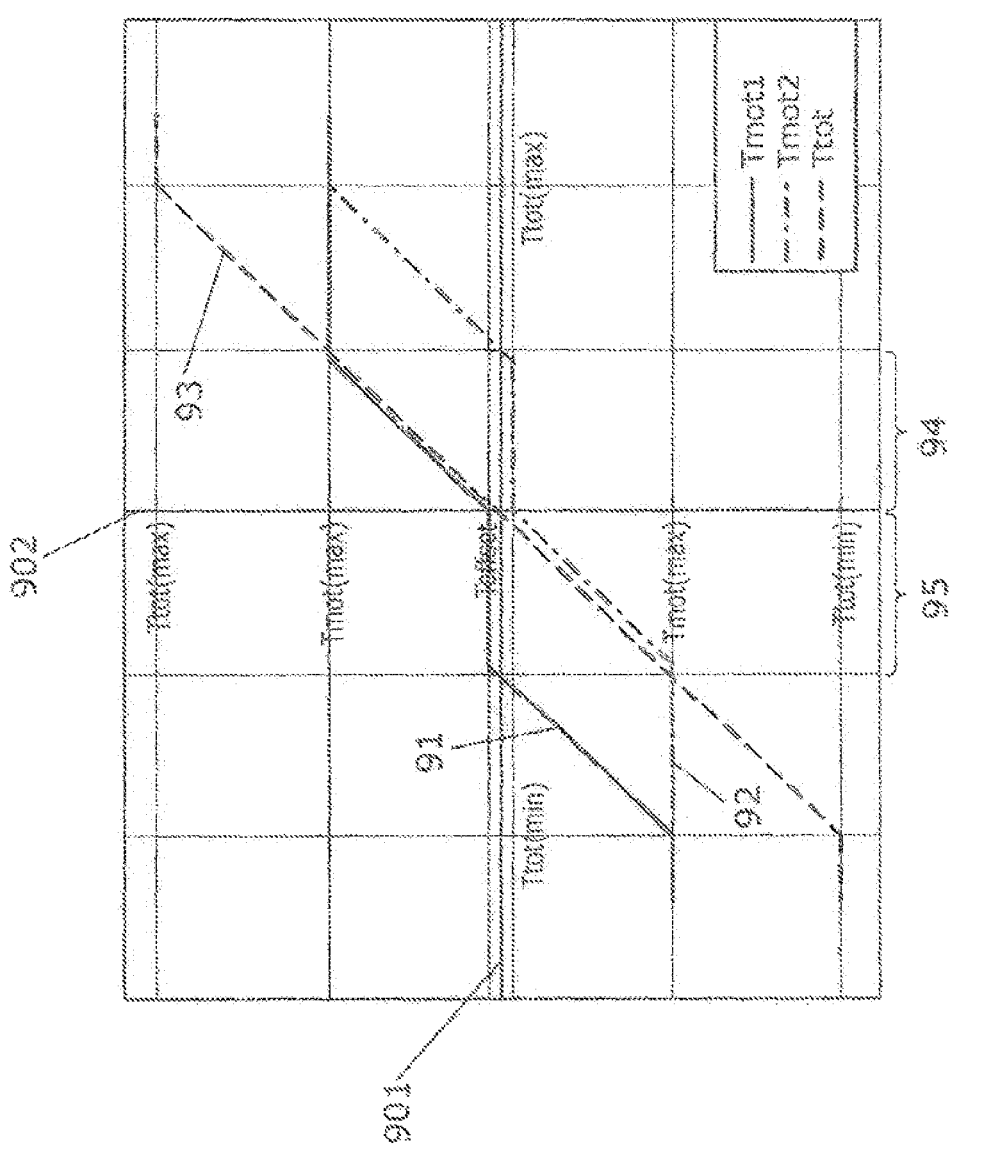
FIG. 6 shows the relationship between the feedback torque demanded and the feedback torque applied for a dual motor drive assembly.

FIG. 5 shows an overall layout of a Steer-by-Wire system 100 for a vehicle including handwheel actuator (HWA) assembly 80 using a dual motor drive assembly 1 according to an exemplary arrangement of the disclosure. The HWA assembly 80 supports the driver's handwheel 26 and measures the driver demand which is usually the steering angle. A steering controller 81 converts the driver demand into a position demand that is sent to a front axle actuator (FAA) 82. The FAA 82 controls the steering angle of the road-wheels to achieve the position demand. The FAA 82 can feedback operating states and measurements to the steering controller 81.

The steering controller 81 combines the FAA 82 feedback with other information measured in the vehicle, such as lateral acceleration, to determine a target feedback torque that should be sensed by a driver of the vehicle. This feedback demand is then sent to the HWA control system 21 and is provided by controlling the first and second motors 10, 11 with the first and second motor controllers 22, 23 respectively.

FIG. 5 shows the steering controller 81 as physically separate to both the HWA controller 21 and the FAA 82. In another exemplary arrangement, different architectures, where one or more of these components are physically interconnected, may be used within the scope of this disclosure. For example, the functions of the steering controller 81 may be physically implemented in the HWA controller 21, the FAA 82, or another control unit in the vehicle, or some combination of all 3. In another exemplary arrangement, control functions ascribed to the HWA controller 21 and FAA 82 may be partially or totally implemented in the steering controller 81.

Figure 7:
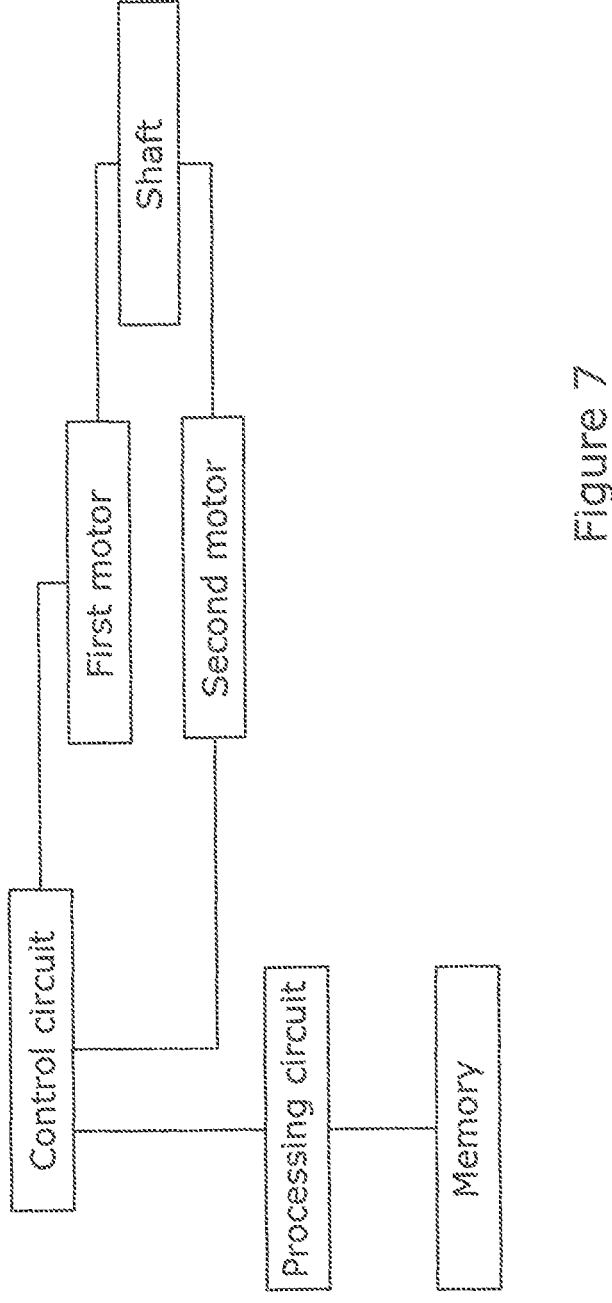
FIG. 7 is a block diagram showing the control of the motors during the calculation of the mechanical friction and imbalance.
Figure 8:
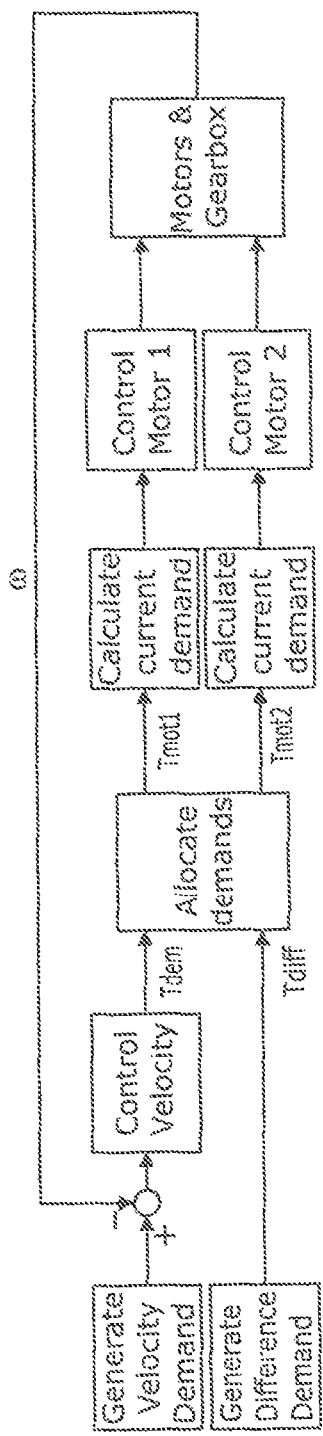
FIG. 8 is a plot of the shaft Angle, shaft Velocity and torque difference (Tdiff) demands obtained whilst estimating the mechanical friction and imbalance.

FIG. 7 is a schematic of the HWA showing the control circuit and processing circuits. As can be seen the control circuit generates the motor torque demand and supplies the appropriate drive signals to the two motors. The processing circuit observes the signals within the control circuit and from these estimates the mechanical friction and the motor imbalance. FIG. 8 shows in more detail the parts of the schematic of FIG. 7 associated with the control of the motors during the calculation of the mechanical friction and imbalance. In this example, the motor is controlled using a velocity demand control process in which the input to the control circuit is a demanded velocity. The control circuit sets motor torque demands as required to achieve the demanded velocity based on measurements of the shaft velocity. In another exemplary arrangement, the control circuit may use an angle based control scheme in which a ramped shaft angle is fed to the control circuit. By ramping the demanded shaft angle linearly between two angles the control circuit will function to make the motor rotate at a constant velocity. The shaft angle is be fed back to the control circuit.

The steering controller is configured to perform a test or set of tests which enable an estimate of the friction in the system to be made and also to estimate the value of any imbalance between the two motors.

The tests are performed with the two motors running against each other to vary the load-dependent friction whilst monitoring the net motor torque that is required to turn the handwheel against the friction and to compensate for any lane-to-lane imbalance.

It will be appreciated by those skilled in the art that, in some cases, the handwheel may be designed to have an uneven distribution of mass about its steering axis. This unbalanced mass will act with gravity to give a torque that varies sinusoidally with the angle of the handwheel. In many cases this torque is relatively small. The effect of the torque that varies sinusoidally on the tests described below can be minimised by performing the tests over a range of angles in which the gravity-effect is small, or by compensating the test results with an estimate of the torque that is calculated from the measured handwheel angle and predetermined knowledge of the handwheel mass imbalance that can be stored in the Processing Circuit Memory.

The torque that is applied to the column is:

$$T_{col} = N_{gb} \, T_{mot1} + N_{gb} \, T_{mot2} \pm N_{gb} \, T_{loss1} \pm N_{gb} \, T_{loss2}$$

where $T_{col}$=column torque $N_{gb}$=gearbox ratio $T_{mot1}$=motor 1 shaft torque $T_{mot2}$=motor 2 shaft torque $T_{loss1}$=torque losses associated with motor 1

$T_{loss2}$=torque losses associated with motor 2

The losses act in a direction to oppose the motion of the column.

Each of the motors is controlled to meet the torque demand. Typically the torque demand is converted to a motor current demand and the motor currents are controlled with a closed-loop controller. Within the motors and motor controllers there may exist gain errors in which the motor outputs do not exactly reflect the input demands. We shall represent this as an imbalance between the two motors that is applied in equal and opposite sense.

$$\text{Tmot1} = (1+b)\text{Tmot1(dem)}$$

$$\text{Tmot2} = (1-b)\text{Tmot2(dem)}$$

where b is the imbalance and Tmot1(dem) and Tmot2 (dem) are the motor torque demands. We shall assume 0<b<1.

When moving (i.e. rotating), the torque losses may be due to the combination of electromagnetic losses in the motor, Coulomb friction in the motor and gearbox and other sources of damping in the mechanical system. Together these have a constant component and a load-dependent component, i.e.

$$\text{Tloss1} = \mu |\text{Tmot1}| + Tc1$$

where |Tmot1| is the magnitude of the motor torque and Tc1 is the constant component.

The load-dependent loss is determined by the factor μ that depends on the design and materials employed in the worm and wheel gearbox and the rest of the load-bearing path. In practice p will vary with temperature and the condition of the gearbox.

We shall assume that the same friction coefficient applies to both motors. Then the friction that is load-dependent is:

$$Tfr = Ngb\ \mu(|\text{Tmot1}| + |\text{Tmot2}|)$$

where Tfr is the mechanical friction at the gearbox output.

The two motor torque demands can be calculated to provide a target column torque demand and a target friction torque demand. One suitable calculation is:

$$\text{Tmot1(dem)} = (1/Ngb)(\text{Tdem} + \text{Tdiff})/2$$

$$\text{Tmot2(dem)} = (1/Ngb)(\text{Tdem} - \text{Tdiff})/2$$

where Tdem is the demanded net torque and Tdiff is the demand torque difference between motor 1 and motor 2. Tdem and Tdiff should be limited so that they do not exceed the maximum motor torque. It is possible to swap this calculation so that motor 1 and motor 2 are exchanged.

This disclosure is concerned with the Coulomb friction, not stiction. It is desirable to estimate the friction with the shaft and motors moving. FIG. 8 shows an example of a control system that can be used to measure the friction. This has the following features.

Figure 9:
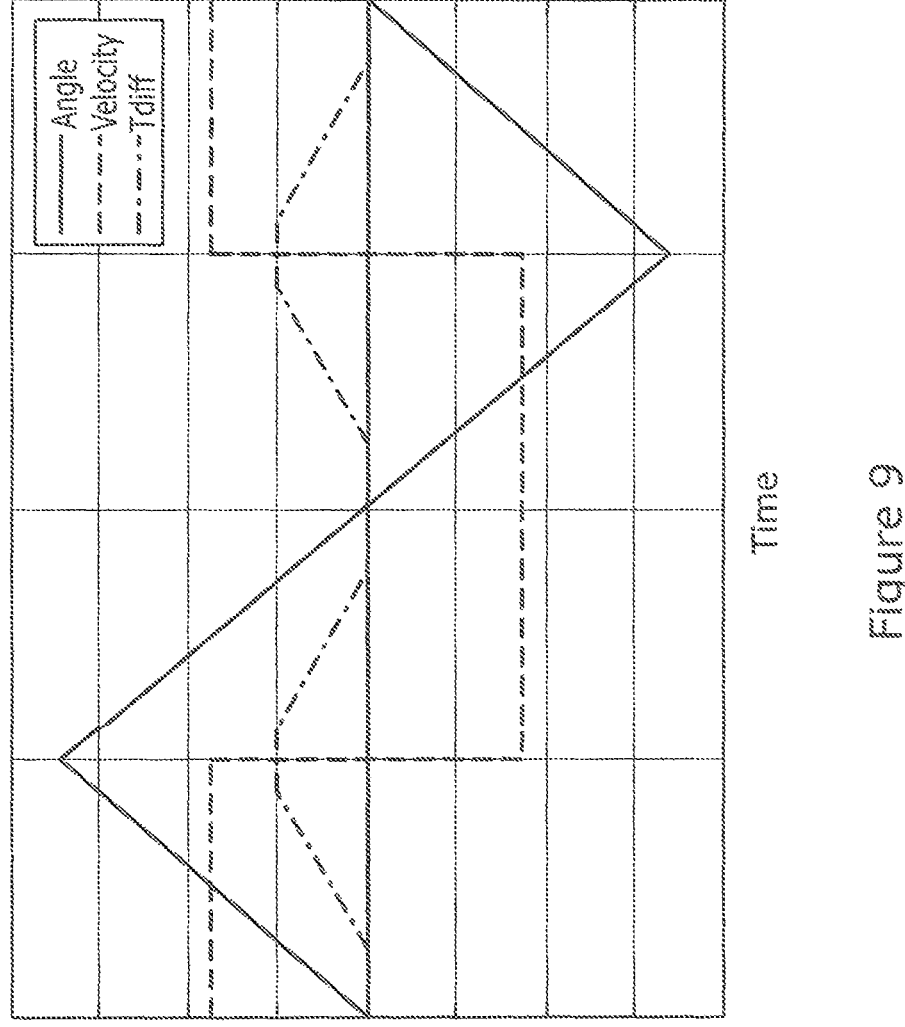
FIG. 9 is a plot showing an example of how the net applied torque (Tdemand) is set to achieve velocity demand when Tdiff is varied over time.

A pre-set velocity demand profile. This can contain sections of constant velocity so that the measurements can be made without needing to take account of torque required to accelerate and decelerate the handwheel. FIG. 9 shows an example of the control demand time histories that can be used. In the example, the measurement is carried out with both positive and negative velocities which allows an average friction and the motor-to-motor imbalance to be calculated. Typically, the velocity will be relatively low to minimise the movement of the handwheel; it should be fast enough to ensure an accurate friction measurement can be made.

A pre-set difference torque demand profile. As shown in the example in FIG. 8, this should be synchronised with the velocity demand. In this example, the difference torque is positive.

A velocity control loop that calculates the velocity error and sets the net torque demand, Tdem, to control the velocity to match the demand. The velocity controller may include dynamic elements to compensate for the response of the system under control so that the response to the demand is accurate, not resonant and does not "stick-slip" in the presence of stiction.

The difference torque demand and the net torque demand are used to allocate the torque demands to the two motors according to the calculation given above.

Each of the motors is controlled to meet the torque demand. Typically, the torque demand is converted to a motor current demand and the motor currents are controlled with the closed-loop control circuit. It is expected that the control circuit bandwidth will be adequate so that the controller errors are low compared to the magnitude of the friction torque that is being estimated.

Each motor transmits torque to the shaft through the worm gearset.

Figure 10:
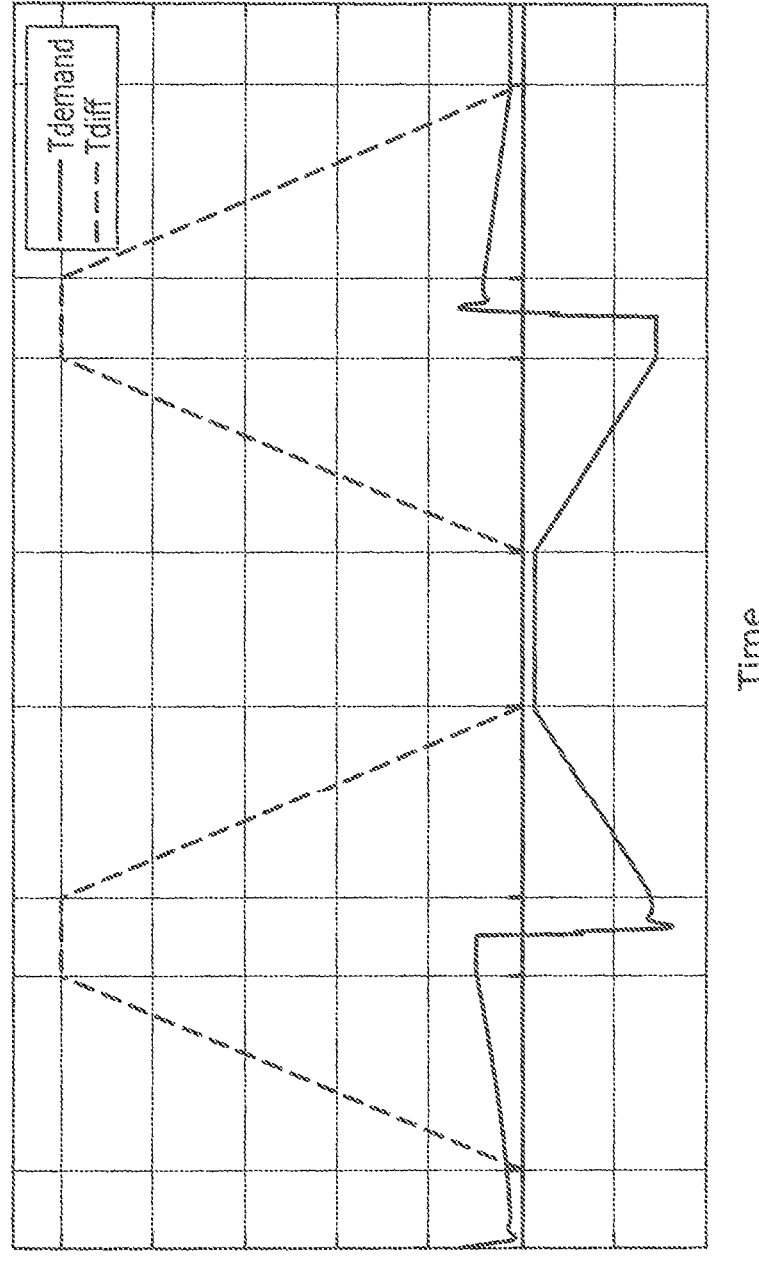
FIG. 10 is a plot showing how the estimated components for constant friction, imbalance, and friction coefficient can be added to fit the measured torque demand during the test shown in FIG. 9.

The skilled person will appreciate that the control circuit used to perform the test is not necessarily the same as the control system that is normally used to operate the HWA. The control circuit in FIG. 8 is operated to allow the time profiles shown in FIG. 9 to be imposed. During this time the torque demand, Tdem, is periodically recorded. The description below assumes that a continuous record is available but it is possible to record a small number samples at important points in the test to achieve a similar result. FIG. 10 shows examples of measured signals against time for the test pattern of FIG. 9.

The acquired data is fed to the processing circuit shown in FIG. 7 where it is analysed to determine the load-dependent friction. This is done assuming that the torque required to maintain the constant velocity is mostly required to overcome the friction in the HWA components. The example in FIG. 10 shows that the net demanded torque, Tdem, has some transients that are required to accelerate or decelerate the HWA. In other periods during the test, Tdiff is ramped up and down and it can be seen that Tdem is varying in a linear fashion. This linear portion is identified as the region in which the friction estimate can be made.

As explained above, the torque applied to the column includes the frictional loss, and the frictional loss depends on the difference torque.

$$\text{Tmot1} = (1+b)(1/Ngb)(\text{Tdem} + \text{Tdiff})/2$$

$$\text{Tmot2} = (1-b)(1/Ngb)(\text{Tdem} - \text{Tdiff})/2$$

The Coulomb friction in the HWA consists of a constant component and a load-dependent component. The total friction magnitude is given by $$Tf = \mu c + \mu(|Ngb\ \text{Tmot1}| + |Ngb\ \text{Tmot2}|)$$

where Tf=total friction, μc=constant friction, μ=friction coefficient of gearbox, Ngb is the gearbox ratio and |•| denotes the absolute value.

The direction of the action of friction depends on the direction of rotation and direction of the applied torques. In the constant speeds sections of the test regime described, the friction magnitude can be simplified to $$Tf = \mu c + \mu(b\ \text{Tdem} + \text{Tdiff}))$$

In other operating conditions, the absolute values of Tmot1 and Tmot2 will combine in different ways.

The total torque acting on the handwheel is then $$Tnet = Ngb\ Tmot1 + Ngb\ Tmot2 - Tf\ \text{sgn}(w) =$$

$$Tdem + b\ Tdiff - \{\mu c + \mu\ (b\ Tdem + Tdiff))\}\ \text{sgn}(w)$$

At the time periods where the torque applied to the column is largely overcoming the friction and not accelerating the handwheel or providing a feedback torque to the driver, we have $$Tnet \approx 0$$

This can be rewritten as $$Tdem \approx -b\ Tdiff + \mu c\ sgn(w) + \mu b\ Tdem\ sgn(w) + \mu Tdiff\ sgn(w)$$

We expect the product $\mu b$ to be small so a further simplification can be made $$Tdem \approx -b\ Tdiff + \mu c\ sgn(w) + \mu\ Tdiff\ sgn(w)$$

In this case, with test results for different values of Tdiff and sgn(w), the best-fit of −Tdiff, sgn(w) and Tdiff sgn(w) to Tdiff can be used to directly estimate b, μc and μ.

Figure 11:
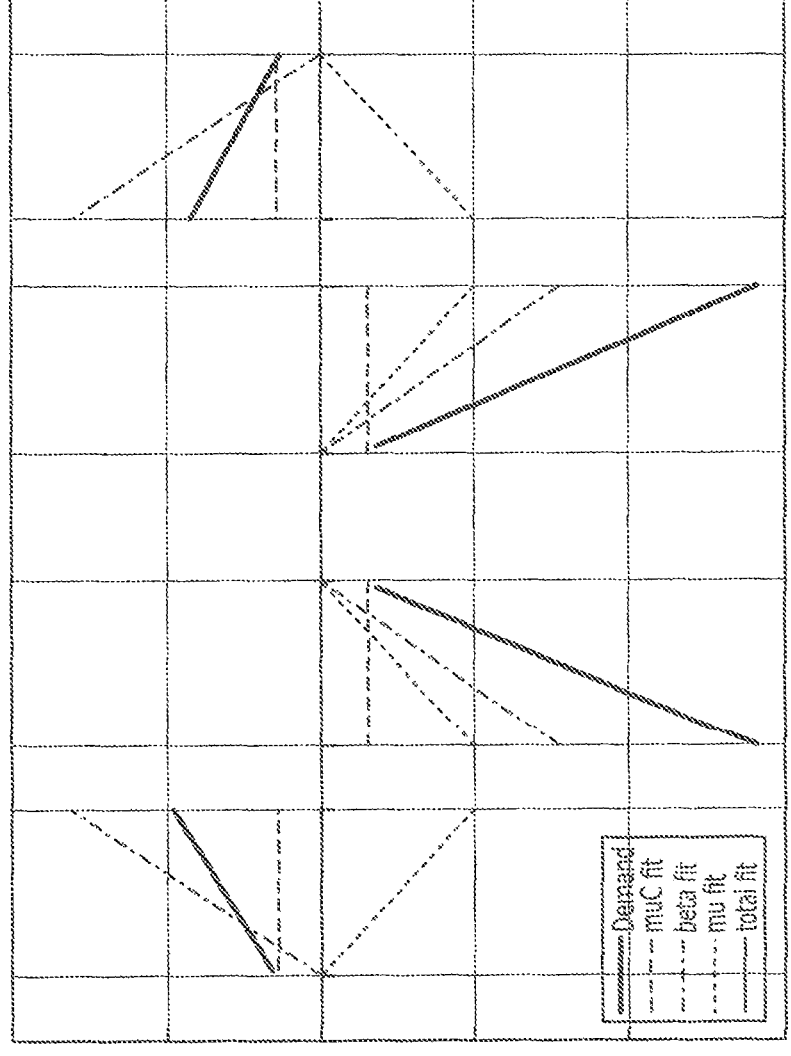
FIG. 11 is a plot showing estimated components plotted against time in regions of the test where a substantially constant velocity is achieved.

An example is plotted in FIG. 11 which shows the estimated components plotted against time in the regions of the test where a substantially constant velocity is achieved. It can be seen that good estimates for the three components can be achieved and that the total is a good fit to Tdem.

The figure shows a linear fit to a continuous measurement. A practical implementation may only measure a few points and use these to find the average slope or offset for the three components.

Once the estimated values of b, pc and p have been obtained, they can be used to check the condition of the HWA. This can be done by comparison to reference values, or by checking the trend of measurements taken on different journeys, or by another process.

This method does not provide an absolute measurement of the motor torque output. If only one motor has an error that causes an imbalance, then the results will be biased so that the friction estimate will be distorted. Nevertheless this can still be used for the purposes of condition monitoring. Further improvements to the measurement can be obtained by additional measurement cycles with the torque difference reversed.

The estimated values of b, pc and p can also be used for a real-time friction compensation algorithm.

The invention claimed is:

1. A dual motor drive assembly comprising:
a housing;
a shaft rotatably mounted with respect to the housing;
a first gear connected to and configured to rotate with the shaft;
first and second motor circuits, each motor circuit including a motor having an output driving a respective output gear, the output gears being engaged with the first gear,
a control circuit adapted to allocate independent torque demands to each of the first and second motors to cause a net torque to be applied to the shaft comprising the sum of the torques applied by the two motors, and
a processing circuit adapted to estimate the level of load independent mechanical friction of the system by applying torque demands to the two motors that include equal and opposite offset components which provide a net zero torque plus an additional torque component that is applied to the motors to provide an overall non-zero torque to the first gear,
in which the processing circuit varies the difference between the motor torques demanded from each motor over a range of values at a time when there are no external inputs to the system and observes the lowest value of the net torque within that range that overcomes the mechanical friction to cause the shaft to rotate at a constant velocity and in which the processing circuit is further arranged to estimate any imbalance between the two motor circuits by observing the difference in the values of the net torque demands required to cause the shaft to rotate at the constant speed in a first direction and the values of the net torque demands required to cause the shaft to rotate at a constant speed in the opposite direction.

2. A dual drive assembly according to claim 1 in which the processing circuit identifies the net torque that overcomes the friction as the value which causes the shaft to rotate at a constant angular speed whilst keeping the offset torque values at a constant level.

3. A dual motor drive assembly according to claim 1 in which the processing circuit varies the magnitude of the offset components to vary the load dependent friction in the system and to estimate the mechanical friction coefficient of the system as a function of the load applied to the gearbox by the offset components.

4. A dual motor drive assembly according to claim 1 in which the processing circuit estimates the mechanical friction as a function of the applied load by identifying the net torque that is required to overcome the friction whilst difference in torque applied by the first and second motors is changed whilst adjusting the net applied torque to keep the shaft rotating at a constant angular speed in both a first direction of movement, and a second direction.

5. A dual motor drive assembly according to claim 1 in which estimating the friction and imbalance is adapted to cause the shaft to rotate at two or more different speeds and to identify the net torque required to just overcome the friction for each speed as the value which maintains those different speeds.

6. A dual motor drive assembly according to claim 1, which comprises a part of a Steer-by-Wire Handwheel actuator assembly for a vehicle.

7. A method of determining the imbalance between two motors in a dual motor drive assembly the method comprising:
applying drive signals to the two motors to cause them to apply torques to a shaft that add up to the total demand torque with a varying difference between the two motor torque levels over a range of values at a time when there are no external inputs to the system; and
observing the net torque that overcomes the mechanical friction to cause the shaft to turn at a constant velocity with a particular difference between the first and second motor torque,
and further comprising estimating the imbalance between the two motors by measuring the demanded net torque required to maintain a constant speed in two directions of movement.

8. A dual motor drive assembly comprising:
a shaft rotatably mounted with respect to a housing;
a first gear connected to and configured to rotate with the shaft;
first and second motor circuits, each motor circuit including a motor having an output driving a respective output gear, the output gears being engaged with the first gear,
a control circuit adapted to allocate independent torque demands to each of the first and second motors to cause a net torque to be applied to the shaft comprising the sum of the torques applied by the two motors, and
a processing circuit adapted to estimate the level of load independent mechanical friction of the system by applying torque demands to the two motors that include equal and opposite offset components which provide a net zero torque plus an additional torque component that is applied to the motors to provide an overall non-zero torque to the first gear, in which the processing circuit varies the difference between the motor torques demanded from each motor over a range of values, and in which the processing circuit is further arranged to estimate any imbalance between the two motor circuits.

9. A dual drive assembly according to claim 8, wherein the processing circuit identifies the net torque that overcomes the friction as the value which causes the shaft to rotate at a constant angular speed while keeping the offset torque values at a constant level.

10. A dual motor drive assembly according to claim 8, wherein the processing circuit varies the magnitude of the offset components to vary the load dependent friction in the system and to estimate the mechanical friction coefficient of the system as a function of the load applied to the gearbox by the offset components.

11. A dual motor drive assembly according to claim 8, wherein the processing circuit estimates the mechanical friction as a function of the applied load by identifying the net torque that is required to overcome the friction while the difference in torque applied by the first and second motors is changed whilst adjusting the net applied torque to keep the shaft rotating at a constant angular speed in both a first direction of movement, and a second direction.

12. A dual motor drive assembly according to claim 8, wherein estimation of the friction and imbalance is adapted to cause the shaft to rotate at two or more different speeds and to identify the net torque required to just overcome the friction for each speed.

* * * * *